United States Patent [19]
Takano et al.

[11] Patent Number: 5,172,322
[45] Date of Patent: Dec. 15, 1992

[54] VEHICULAR TRAVELING DIRECTION MEASURING SYSTEM WITH AUTOMATIC CENTER COORDINATE POSITION CORRECTION

[75] Inventors: Kenji Takano; Hiroshi Ueno, both of Kanagawa, Japan

[73] Assignee: Nissan Motor Company, Limited, Japan

[21] Appl. No.: 565,836

[22] Filed: Aug. 13, 1990

[30] Foreign Application Priority Data

Aug. 11, 1989 [JP] Japan ................................. 1-206971

[51] Int. Cl.⁵ .............................................. G01C 17/38
[52] U.S. Cl. .................................... 364/449; 364/453; 364/571.05; 33/356
[58] Field of Search ............ 364/449, 453, 454, 571.01, 364/571.02, 571.03, 571.04, 571.05, 457; 33/320, 356, 357, 355 R, 361

[56] References Cited

U.S. PATENT DOCUMENTS

| | | | |
|---|---|---|---|
| 4,497,034 | 1/1985 | Kuno et al. ..................... | 364/571.04 |
| 4,611,293 | 9/1986 | Hatch et al. ..................... | 364/559 X |
| 4,660,161 | 4/1987 | Okada ............................ | 364/457 X |
| 4,686,772 | 8/1987 | Sobel .............................. | 33/356 X |
| 4,738,031 | 4/1988 | Alberter et al. ................. | 33/356 |
| 4,750,349 | 6/1988 | Luitje ............................. | 364/571.04 X |
| 4,751,783 | 6/1988 | Ina et al. ........................ | 33/361 |
| 4,767,988 | 8/1988 | Wilson ........................... | 33/355 R X |
| 4,771,547 | 9/1988 | Akatsu et al. ................... | 33/356 |
| 4,791,574 | 12/1989 | Thoone et al. .................. | 364/450 X |
| 4,797,841 | 1/1989 | Hatch ............................. | 364/559 X |
| 4,841,449 | 6/1989 | Suyama ........................ | 364/571.04 X |
| 4,852,012 | 7/1989 | Suyama ........................ | 364/449 |
| 4,862,398 | 8/1989 | Shimizu et al. ................ | 364/571.05 |
| 4,866,627 | 9/1989 | Suyama ........................ | 364/457 |
| 4,870,602 | 9/1989 | Baumker ........................ | 364/571.02 |
| 4,972,593 | 11/1990 | Dahlen et al. ................. | 33/356 |
| 4,989,333 | 2/1991 | Helldorfer et al. ............. | 33/356 |
| 5,023,799 | 6/1991 | Nakayama et al. ............ | 364/449 |
| 5,117,375 | 5/1992 | Worcester et al. ............. | 364/571.01 |

Primary Examiner—Parshotam S. Lall
Assistant Examiner—Thomas S. Auchterlonie
Attorney, Agent, or Firm—Lowe, Price, LeBlanc & Becker

[57] ABSTRACT

A system measures a traveling direction of a vehicle based on a direction toward a coordinate position defined by output data from a geomagnetic direction sensor from a first center coordinate position of a corresponding output circle. The system derives a second center coordinate position based on the output data from the geomagnetic direction sensor. The system utilizes a first group of the second center coordinate positions and a second group of the second center coordinate positions. When it is decided that the first center coordinate position is shifted, then a new or corrected center coordinate position is derived based on the first group of the second center coordinate positions, on the other hand, when it is decided that no shift of the first center coordinate position is generated, then the corrected center coordinate positiion is derived based on the second group of the second center coordinate positions.

14 Claims, 8 Drawing Sheets

VEHICULAR TRAVELING DIRECTION MEASURING SYSTEM WITH AUTOMATIC CENTER COORDINATE POSITION CORRECTION

BACKGROUND OF THE INVENTION

1. Field of the Invention

This invention relates generally to a system for measuring a traveling direction of a vehicle using a geomagnetic direction sensor and, more specifically, to a vehicular traveling direction measuring system which derives a traveling direction of the vehicle based on a direction toward a coordinate position defined by output data from the geomagnetic direction sensor from a center coordinate position of a corresponding output circle, wherein correction of the center coordinate position is automatically performed to derive a precise traveling direction of the vehicle.

2. Description of the Background Art

One of previously proposed systems for measuring a vehicle traveling direction is exemplified by, such as, Japanese First Patent Publication No. 59-100812 published on Jun. 11, 1984.

In the system of this publication, a geomagnetic direction sensor is used for measuring the traveling direction of the vehicle. The geomagnetic direction sensor has a pair of windings which are intersected in perpendicular to each other and arranged on an annular core in a horizontal posture. The geomagnetic direction sensor outputs detected voltages (output values) corresponding to geomagnetic directional components interlinked to the respective windings.

When the vehicle makes one turn under the uniform geomagnetism, an output circle is described on a coordinate plane using coordinate positions each defined by the voltages detected at the respective windings. Accordingly, during a normal traveling of the vehicle, a direction from a center of the output circle toward a coordinate position defined by the detected voltages is derived as a traveling direction of the vehicle.

On the other hand, when the vehicle body is magnetized or when a magnetization level on the vehicle body is changed due to the disturbance of the environmental geomagnetism, the center of the output circle is caused to vary or move, thus resulting in an error in measurement of the traveling direction of the vehicle. To correct this error, one turn of the vehicle is required to derive a new center of a corresponding output circle. Specifically, the output values of the geomagnetic direction sensor are sampled during one turn of the vehicle and then averaged to derive a new or corrected center of the output circle.

In the foregoing background art, however, because a small number of the output values are sampled to be averaged even when the magnetic environment is not preferable, it is substantially impossible to derive a corrected center coordinate position of a corresponding output circle with high accuracy. Further, one turn of the vehicle has to be performed by a driver for the correction.

Still further, although it is desirable to make one turn of the vehicle as soon as possible after the vehicle body is magnetized, it is practically difficult to seek a proper place for making the vehicle turn. Accordingly, the direction measurement error remains or increased during the traveling of the vehicle until finding the proper place for making the vehicle turn.

Further, when the foregoing correction of the center coordinate position of the output circle is performed in the condition of the large disturbance of the environmental geomagnetism, such as, on a road under a high level road or among high buildings, the correction accuracy becomes less in comparison with the correction accuracy performed in the condition of smaller disturbance of the geomagnetism. Accordingly, the corrected coordinate position of the center of the output circle tends to be unreliable so that the correction itself becomes meaningless.

In Japanese First Patent Publication No. 59-210317, the magnetization of the vehicle body is detected when the absolute output value of the environmental geomagnetism exceeds a preset value. This detection of the magnetization is alarmed to the driver. However, due to variation in geomagnetic intensity at different places or areas, even when the absolute output value of the environmental geomagnetism exceeds the preset value, it does not necessarily mean that the vehicle body is magnetized. Accordingly, the driver is embarrassed by the detection alarm to find a proper place for making one turn of the vehicle even when the vehicle body is actually not magnetized, i.e. the correction of the center coordinate position of the output circle is not necessary.

SUMMARY OF THE INVENTION

Therefore, it is an object of the present invention to provide a system for measuring a traveling direction of a vehicle that can eliminate the above-noted defects inherent in the background art.

It is another object of the present invention to provide a system for measuring a traveling direction of a vehicle that can provide an accurate measurement of a traveling direction of the vehicle by automatically correcting a coordinate position of a center of an output circle with high accuracy, but without requiring a vehicle driver to make any turn of the vehicle, even when the center coordinate position is moved due to variations in magnetic conditions around geomagnetic sensor means, such as, due to magnetization of a vehicle body or shifting of a vehicular magnetization level from a certain value to another, due to opening and closing operations of a sunshine roof with the geomagnetic sensor means being disposed near the sunshine roof, due to opening and closing operations of a sun visor with the geomagnetic sensor means being disposed near the sun visor, due to existence of magnetic substance being disposed near the geomagnetic sensor means, due to environmental conditions around the vehicle, such as, among high buildings or on a road under a high level road, and the like.

To accomplish the above-mentioned and other objects, according to one aspect of the present invention, a system comprises:

geomagnetic sensor means for sequentially deriving a set of two directional component data of the geomagnetism around a vehicle, the two directions being orithogonal to each other on a horizontal plane to define a first coordinate position by each set of the two directional component data;

traveling direction deriving means for deriving a traveling direction of the vehicle based on a direction toward the first coordinate position from a second center coordinate position of a corresponding output circle;

first means for sequentially deriving a third center coordinate position based on the first coordinate positions;

second means for storing a first group of the third center coordinate position data;

third means for storing a second group of the third center coordinate position data;

fourth means for deriving a fourth center coordinate position based on the first group of the third center coordiante position data;

fifth means for deriving a first value indicative of reliability of the fourth center coordinate position based on the first group of the third center coordinate position data and the fourth center coordinate position;

sixth means for deriving a fifth center coordinate position based on the second group of the third center coordinate position data;

seventh means for deriving a second value indicative of reliability of the fifth center coordinate position based on the second group of the third center coordinate position data and the fifth center coordinate position;

eighth means for deciding whether the second center coordinate position is shifted from a first level to a second level;

ninth means, in response to a positive decision of the eighth means, for setting the fourth center coordinate position to be a first finally corrected value of the second center coordinate position, the first finally corrected value being derived for the second level;

tenth means, in response to a negative decision of the eighth means, for setting the fifth center coordinate position to be a second finally corrected value of the second center coordinate position, the second finally corrected value, being derived for the first level;

the eighth means deciding the shift of the second center coordinate position based on the first reliability indicative values derived in current and prior executions of the fifth means, respectively, when the first finally corrected value being derived in the prior execution of the ninth means, and based on the first and second reliability indicative values derived in the current and prior executions of the fifth and seventh means, respectively, when the second finally corrected value being derived in the prior execution of the tenth means.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Figure 1:
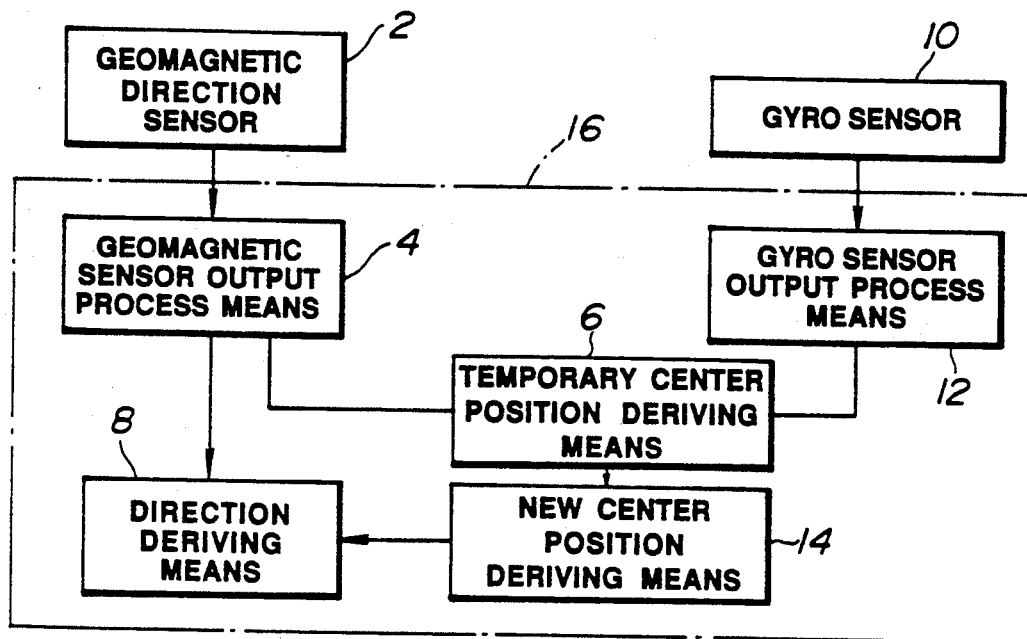
FIG. 1 is a schematic block diagram showing a first preferred embodiment of the present invention.

Referring now to the drawings, first and second preferred embodiments of a vehicular traveling direction measuring system according to the present invention will be described with reference to FIGS. 1 to 14.

FIG. 1 shows a functional block diagram of the vehicular traveling direction measuring system of the first preferred embodiment for schematically explaining the general concepts thereof. In FIG. 1, a geomagnetic direction sensor 2, preferably of a flux gate type, resolves the geomagnetism into two directional components, the two directions being perpendicular to each other on a horizontal plane, and outputs the two directional component data in the form of electrical signals (Vx, Vy) indicative of a coordinate position on an X-Y coordinate plane. The outputs of the geomagnetic direction sensor 2 are converted into digital signals through geomagnetic sensor output process means 4 to be fed to temporary center position deriving means 6 as well as to vehicular traveling direction deriving means 8.

A gyro sensor 10, such as, a rate gyro sensor, outputs a signal indicative of an angular velocity $\omega_G$ in a yawing direction of the vehicle. The gyro sensor 10 is replaceable by, such as, a steering angle sensor and a speed differential sensor which derives a difference in speed between right and left side wheels, as long as its output is not affected by the geomagnetic environment. The output signals of the gyro sensor 10 are converted into digital signals through gyro sensor output process means 12. The gyro sensor output process means 12 derives a variation $\Delta\theta_G$ in the vehicular traveling direction by integration of the angular velocity $\omega_G$.

The outputs from the gyro sensor output process means 12 are fed to the temporary center position deriving means 6. The temporary center position deriving means 6 derives a temporary center coordinate position based on the signals input from the geomagnetic direction sensor 2 through the process means 4 and from the gyro sensor 10 through the process means 12. The derived temporary center coordinate position is fed to new or corrected center position deriving means 14 which derives a new or corrected center coordinate position based on the temporary center coordinate positions fed from the temporary center position deriving means 6. The derived corrected center coordinate position is fed to the direction deriving means 8 which sequentially derives a traveling direction of the vehicle based on a direction toward a coordinate position defined by the two directional component data of the geomagnetic direction sensor 2 through the process means 4 from a center coordinate position derived by the new center position deriving means 14.

The process means 4 and 12, the temporary center position deriving means 6, the new center position deriving means 14 and the direction deriving means 8 form a control unit 16.

Figure 2:
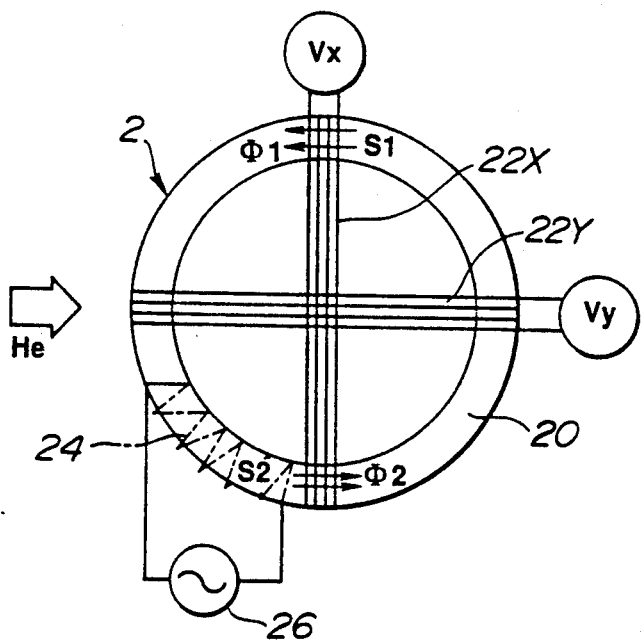
FIG. 2 is a schematic circuit wiring diagram of a geomagnetic direction sensor used in first and second preferred embodiments.
Figure 3:
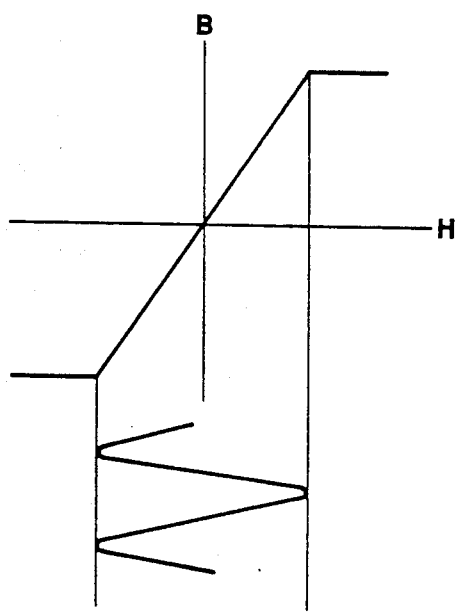
FIG. 3 is a graph of magnetic flux density B versus magnetic field H showing characteristics of energization of the geomagnetic direction sensor of FIG. 2.

FIG. 2 shows a structure of the geomagnetic direction sensor 2 used in the first and second preferred embodiments. The geomagnetic direction sensor 2 includes an annular magnetic core 20 made of a permalloy and a pair of windings 22X and 22Y wound on the magnetic core 20. The windings 22X and 22Y are arranged in perpendicular to each other. Further, a winding 24 is wound on the magnetic core 20. The winding 24 is energized by a power supply 26 so as to energize the magnetic core 20 immediately before saturation as shown in FIG. 3.

Figure 4:
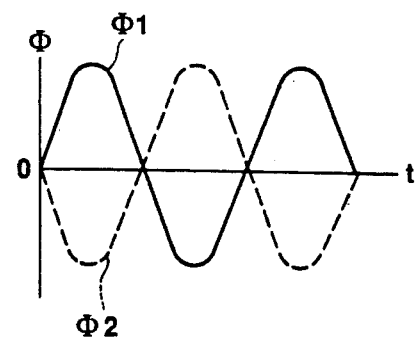
FIG. 4 is a graph of time versus magnetic flux showing a variation in magnetic flux on a permalloy core of the geomagnetic direction sensor under no application of the magnetic field.

When the geomagnetic direction sensor 2 is placed in a non-magnetic field with the power supplied to the winding 24, a magnetic flux $\phi_1$ and a magnetic flux $\phi_2$ passing through positions $S_1$ and $S_2$ of the permalloy core 20, respectively, have the same magnitudes but run in opposite directions to each other (180° out of phase with each other), as shown in FIG. 4. Accordingly, as the magnetic flux interlinked to the winding 22X becomes zero, its detecting voltage expressed by $Vx = -N \, d\phi/dt$ (N denotes the number of turns of the winding), also becomes zero, and similarly, a detecting voltage Vy of the winding 22Y also becomes zero.

Figure 5:
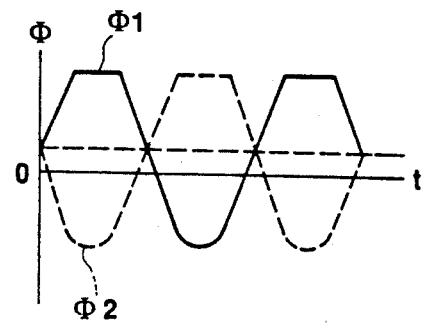
FIG. 5 is a graph of time versus magnetic flux showing a variation in magnetic flux on a permalloy core of the geomagnetic direction sensor under application of the magnetic field.
Figure 6:
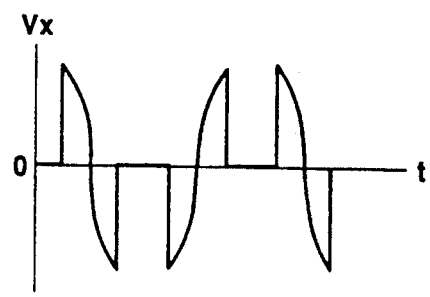
FIG. 6 is a graph of time versus detected voltage showing characteristics of the detected voltages.

Further, when the geomagnetic filed He is applied in perpendicular to the winding 22X as shown in FIG. 2, a bias of the geomagnetic flux density expressed as $Be = \mu He$ ($\mu$ denotes a permeability of the permalloy core) is given to the magnetic flux in the magnetic core 20. Accordingly, the magnetic flux $\phi_1$ and $\phi_2$ becomes asymmetrical as shown in FIG. 5, so that the winding 22X derives the detecting voltage Vx of a waveform as shown in FIG. 6.

On the other hand, because the geomagnetic field He is parallel to the winding 22Y in FIG. 2, no geomagnetic field is interlinked with the winding 22Y so that no voltage Vy is generated in the winding 22Y.

Figure 7:
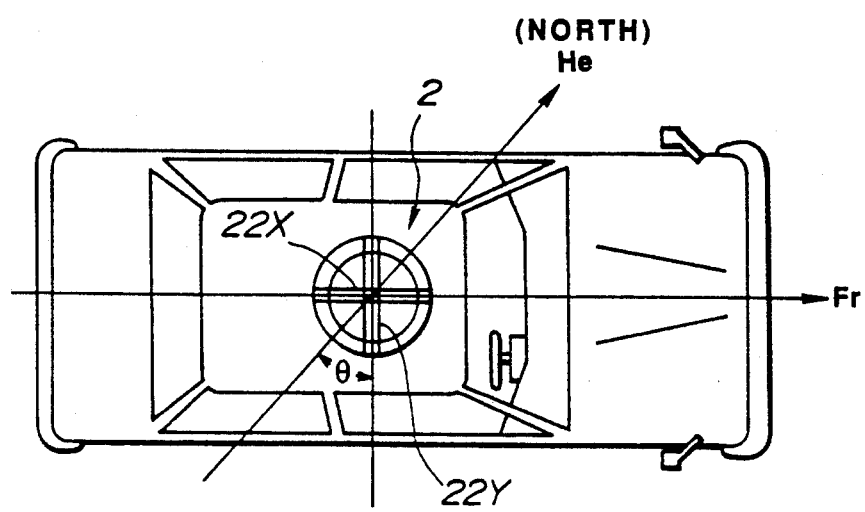
FIG. 7 is a schematic plan view of a vehicle incorporated with the geomagnetic direction sensor of FIG. 2 to explain a traveling direction of the vehicle.
Figure 8:
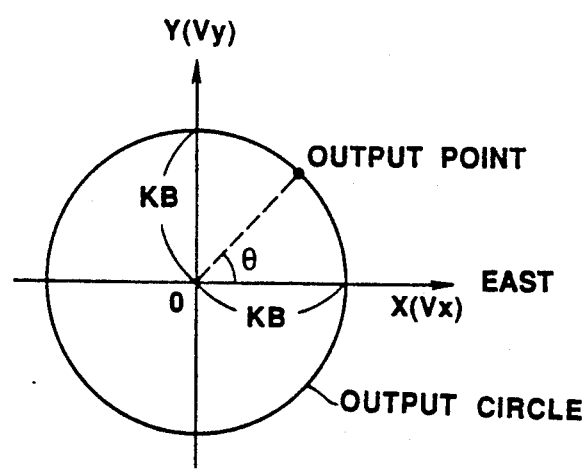
FIG. 8 is an explanatory view of an output circle derived by outputs of the geomagnetic direction sensor.

The geomagnetic direction sensor 2 is mounted on the vehicle in a horizontal posture as shown in FIG. 7. For example, when the geomagnetic field He is applied to both of the windings 22X and 22Y, the detected voltages Vx and Vy (output values) are respectively derived at the windings 22X and 22Y according to the geomagnetic field, as shown in FIG. 8.

The detected voltages Vx, Vy are expressed by the following equations (1) and (2) provided that a value K is a winding constant and a value B is a horizontal component of the geomagnetism He.

$$Vx = KB \cos \theta \quad (1)$$

$$Vy = KB \sin \theta \quad (2)$$

Accordingly, an angle $\theta$ of a traveling direction of the vehicle with respect to a width direction of the vehicle body is expressed by the following equation (3).

$$\theta = \tan^{-1} (Vx/Vy) \quad (3)$$

As appreciated from the equations (1) and (2), when the vehicle makes one turn under the uniform geomagnetic field He, an output circle is described on the X-Y coordinate plane based on coordinate positions each defined by the detected voltages Vx and Vy, as shown in FIG. 8. The output circle is expressed by the following equation (4).

$$Vx^2 + Vy^2 = (KB)^2 \quad (4)$$

Accordingly, because the coordinate position defined by the detected voltages Vx, Vy falls on the output circle, a direction from the center O of the output circle toward the coordinate position (an output point shown in FIG. 8) is derived by the vehicular traveling direction deriving means 8, i.e. the control unit 16 as a traveling direction of the vehicle.

Figure 9:
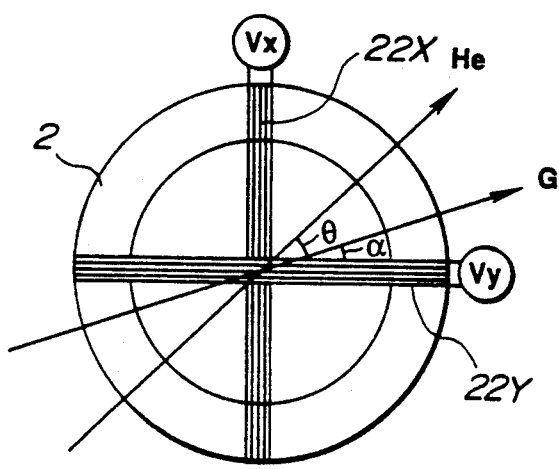
FIG. 9 is an explanatory view showing the geomagnetic direction sensor, wherein a magnetic field other than the geomagnetic field is applied to the geomagnetic direction sensor in addition to the geomagnetic field.
Figure 10:
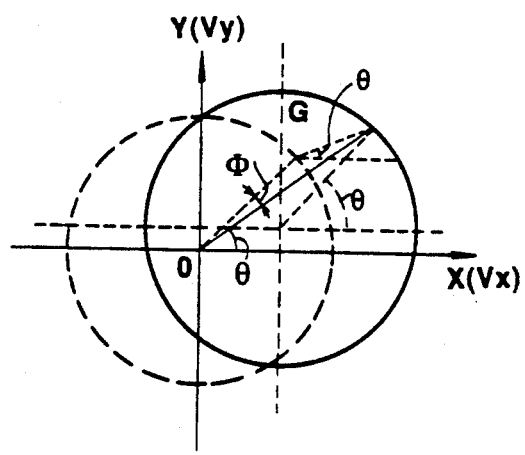
FIG. 10 is an explanatory view showing a displacement of the output circle due to magnetization on the vehicle body.

Assuming that the vehicle is magnetized, an additional magnetic field G is generated and interlinked with the windings 22X, 22Y along with the geomagnetism He, as shown in FIG. 9. Accordingly, the output circle is moved from a broken line position to a solid line position, as shown in FIG. 10. Consequently, the traveling direction of the vehicle derived by the control unit 16 inevitably includes an error because a coordinate position derived after the magnetization on the vehicle body does not fall on the output circle derived before the vehicle magnetization.

In order to correct the above-noted measurement error, the control unit 16 executes a below-described process (corresponding to the temporary center position deriving means 6 and the new or corrected center position deriving means 14 in FIG. 1) for deriving a corrected coordinate position of the center of a corresponding output circle.

Figure 11:
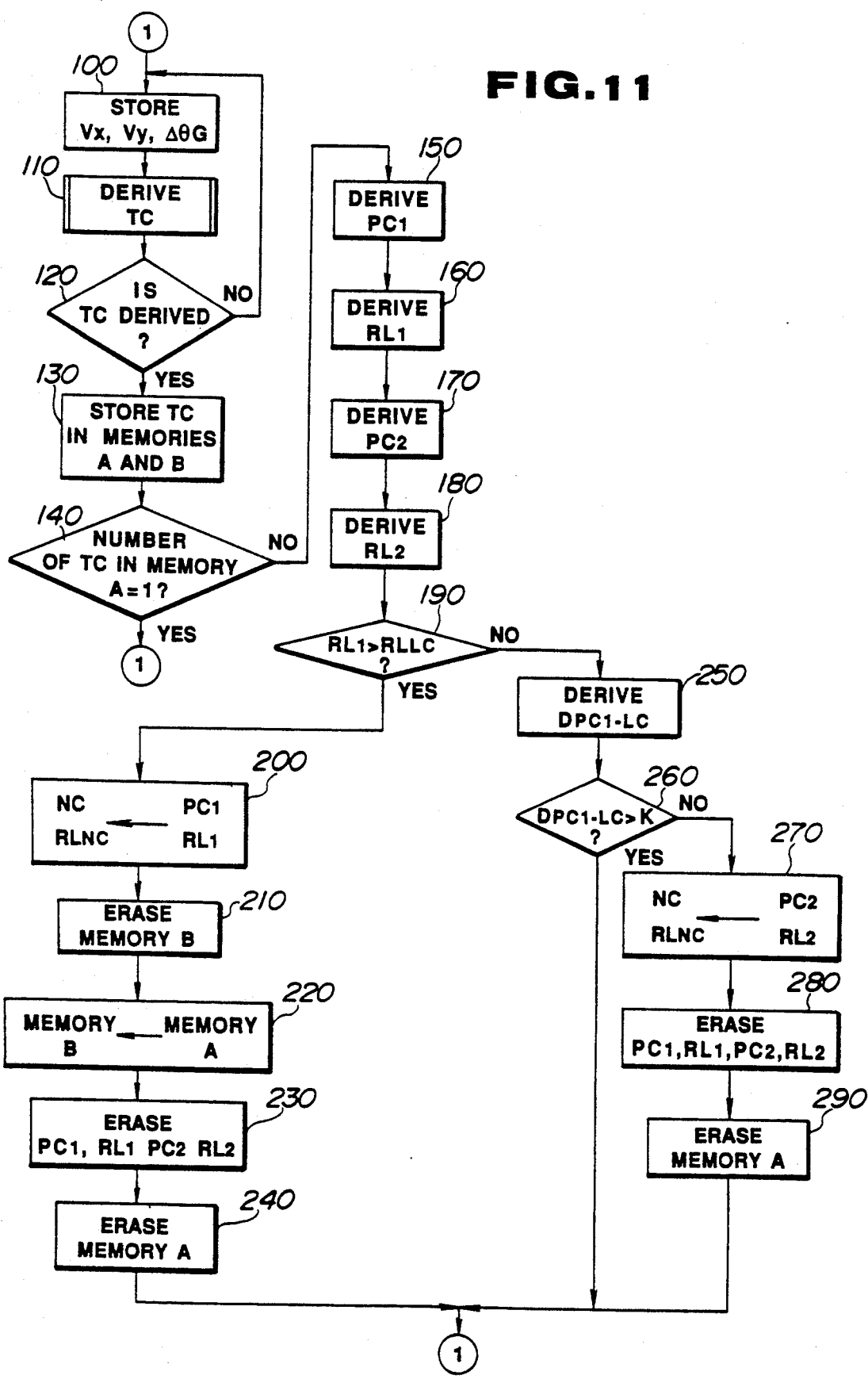
FIG. 11 is a flowchart of a main routine to be executed by a control unit in the first preferred embodiment of FIG. 1 for deriving a new or corrected center coordinate position of a corresponding output circle.

FIG. 11 shows a flowchart of a main routine to be executed by the control unit 16 for deriving a new or corrected center coordinate position of a corresponding output circle.

At a first step 100, the output values Vx and Vy sequentially fed from the geomagnetic direction sensor 2 as well as a variation $\Delta\theta_G$ of a vehicular traveling direction sequentially fed from the gyro sensor 10 are stored.

Subsequently, at a step 110, a temporary center coordinate position TC of a corresponding output circle is derived based on the stored data Vx and Vy using, for example, the method of least squares, or based on the stored data Vx, Vy and $\Delta\theta_G$ using, for example, the method of isosceles triangle, the details of which are disclosed in a co-pending U.S. patent application Ser. No. 552,743 filed on Jul. 13, 1990 entitled 'VEHICULAR TRAVELING DIRECTION MEASURING SYSTEM'. The contents of this co-pending U.S. patent application are incorporated herein by reference for the sake of disclosure. Further, the details of deriving a center coordinate position of a corresponding output circle using the method of least squares are disclosed in Japanese First Utility Model Publication No. 1-144814 published on Oct. 4, 1989, the contents of which are incorporated herein by reference for the sake of disclosure. Still further, the details of deriving a center coordinate position of a corresponding output circle using the method of isosceles triangle are disclosed in Japanese First Utility Model Publication No. 1-117712 published on Aug. 9, 1989, the contents of which are incorporated herein by reference for the sake of disclosure.

Subsequently, at a step 120, it is checked whether the temporary center coordinate position is derived at the step 110. If a decision at the step 120 is NO, i.e. the temporary center coordinate position is not derived at the 110, then the routine goes back to repeat the steps 100 and 110 until the temporary center coordinate position is derived at the step 110. On the other hand, if the decision at the step 120 is YES, then the routine proceeds to a subsequent step 130 where the derived temporary center coordinate position TC is stored in a memory A and a memory B. The temporary center coordinate positions TC stored in the memory A are used for deriving a preliminary center coordinate position $PC_1$, and the temporary center coordinate positions TC stored in the memory B are used for deriving a preliminary center coordinate position $PC_2$, which will be described later in detail.

The above described steps 100 to 130 correspond to the temporary center position deriving means 6 in FIG. 1.

Subsequently, the routine proceeds to a step 140 where it is checked whether the number of TC stored in the memory A is one. If a decision at the step 140 is YES, i.e. the number of TC stored in the memory A is one, then the routine goes back to repeat the steps 100 to 140. If the decision at the step 140 is NO, i.e. the number of TC stored in the memory A is more than one, then the routine goes to a step 150 where the preliminary center coordinate position $PC_1$ is derived based on the temporary center coordinate positions TC stored in the memory A using the following equations (5) and (6).

$$Vx_{PC1} = \left( \sum_{i=1}^{n} Vx_{TCi} \right)/n \qquad (5)$$

$$Vy_{PC1} = \left( \sum_{i=1}^{n} Vy_{TCi} \right)/n \qquad (6)$$

wherein, $Vx_{PC1}$ and $Vy_{PC1}$ are X and Y coordinate values, respectively, of the preliminary center coordinate position $PC_1$, $Vx_{TC}$ and $Vy_{TC}$ are X and Y coordinate values, respectively, of the temporary center coordinate value TC stored in the memory A at the step 130, and n denotes the number of $Vx_{TC}$ and $Vy_{TC}$, respectively, stored in the memory A at the step 130.

Subsequently, the routine proceeds to a step 160 where a standard deviation $\delta_{PC1}$ of $PC_1$ and a reliability $RL_1$ of $PC_1$ are derived based on the following equations (7), (8) and (9).

$$\delta_{PC1} = \qquad (7)$$

$$\left( \left[ \left\{ \sum_{i=1}^{n} (Vx_{TCi} - Vx_{PC1})^2 + (Vy_{TCi} - Vy_{PC1})^2 \right\}/n \right]^{\frac{1}{2}} \right)$$

$$\delta_{PC1R} = \delta_{PC1} \times 100/R \qquad (8)$$

$$RL_1 = 1/\delta^2_{PC1R} \qquad (9)$$

wherein, R is an average output value of the geomagnetism, such as, a value of 300 mG (milligauss).

Subsequently, the routine proceeds to a step 170 where the preliminary center coordinate position $PC_2$ is derived based on the temporary center coordinate positions TC stored in the memory B using the following equations (10) and (11).

$$Vx_{PC2} = \left( \sum_{i=1}^{n} Vx_{TCi} \right)/n \qquad (10)$$

$$Vy_{PC2} = \left( \sum_{i=1}^{n} Vy_{TCi} \right)/n \qquad (11)$$

wherein, $Vx_{PC2}$ and $Vy_{PC2}$ are X and Y coordinate values, respectively, of the preliminary center coordinate position $PC_2$, $Vx_{TC}$ and $Vy_{TC}$ are X and Y coordinate values, respectively, of the temporary center coordinate value TC stored in the memory B at the step 130 and transferred from the memory A at a step 220, which will be described later, and n denotes the number of $Vx_{TC}$ and $Vy_{TC}$, respectively, stored in the memory B at the step 130 and transferred from the memory A at the step 220.

Subsequently, the routine proceeds to a step 180 where a standard deviation $\delta_{PC2}$ of $PC_2$ as well as a reliability $RL_2$ of $PC_2$ are derived based on the following equations (12), (13) and (14).

$$\delta_{PC2} = \qquad (12)$$

$$\left( \left[ \left\{ \sum_{i=1}^{n} (Vx_{TCi} - Vx_{PC2})^2 + (Vy_{TCi} - Vy_{PC2})^2 \right\}/n \right]^{\frac{1}{2}} \right)$$

$$\delta_{PC2R} = \delta_{PC2} \times 100/R \qquad (13)$$

$$RL_2 = 1/\delta^2_{PC2R} \qquad (14)$$

wherein, R is an average output value of the geomagnetism, such as, a value of 300 mG (milligauss).

As appreciated from the above-noted equations (7) and (12), the standard deviations $\delta_{PC1}$ and $\delta_{PC2}$ respectively indicate a degree of scattering of the preliminary center coordinate positions $PC_1$ and $PC_2$. Accordingly, each of the preliminary center coordinate positions $PC_1$ and $PC_2$ is more reliable when the corresponding standard deviation is smaller, i.e. when the corresponding reliability $RL_1$ or $RL_2$ derived by the equation (8) or (13) is larger.

Now, the routine proceeds to a step 190 where it is decided whether the reliability $RL_1$ is larger than a reliability $RL_{LC}$ of a current center coordinate position LC derived in a prior execution of this routine as a new or corrected center coordinate position NC at a step 200 or 270. The step 190 is provided for checking whether the center coordinate position of the output circle has been shifted from a first position to a second position due to, for example, the magnetization of the vehicle body or the shift of a magnetization level from a first level to a second level, which will be described later. If a decision at the step 190 is YES, i.e. the center coordinate position has been shifted, then the routine goes to a step 200 where the preliminary center coordinate position $PC_1$ derived at the step 150 is set to be the new or corrected center coordinate position NC and the reliability $RL_1$ of $PC_1$ is set to be a reliability $RL_{NC}$ of the new center coordinate position NC. The new center coordinate position NC and the reliability $RL_{NC}$ are used in a next or subsequent execution of this routine as LC and $RL_{LC}$ at the step 190.

Subsequently, at a step 210, the data of the temporary center coordinate positions TC stored in the memory B are all erased. At the subsequent step 220, the date of the temporary center coordinate positions TC stored in the memory A are all transferred to the memory B, and at a subsequent step 230, the date of $PC_1$, $RL_1$, $PC_2$ and $RL_2$ are erased. Subsequently, at a step 240, the data of the temporary center coordinate positions TC stored in the memory A are all erased, and the routine returns to the step 100.

As appreciated, when the decision at the step 190 is YES, the data stored in the memory B are replaced by the data stored in the memory A for further storing new data of TC at the step 130 in the next execution of this routine. On the other hand, the data stored in the memory A are erased for storing only new data of TC at the step 130 in the next execution of this routine. Accordingly, the data stored in the memory A are used for checking occurrence of the shift of the center coordinate position.

On the other hand, if the decision at the step 190 is NO, i.e. the reliability $RL_1$ of $PC_1$ is no more than the reliability $RL_{LC}$ of LC, then the routine proceeds to a step 250 where a distance $D_{PC1-LC}$ between $PC_1$ and LC is derived based on the following equation (15).

$$D_{PC1-LC} = \{(Vx_{PC1} - Vx_{LC})^2 + (Vy_{LC1} - Vy_{LC})^2\}^{\frac{1}{2}} \quad (15)$$

wherein, $Vx_{LC}$ and $Vy_{LC}$ are X and Y coordinate values, respectively, of the current center coordinate position LC.

Subsequently, at a step 260, the derived distance $D_{PC1-LC}$ is compared with a constant K. If a decision at the step 260 is NO, i.e. a movement of the center coordinate position is no more than the constant K, then the routine proceeds to the step 270 where the preliminary center coordinate position $PC_2$ derived at the step 170 is set to be the new or corrected center coordinate position NC and the reliability $RL_2$ of $PC_2$ is set to be the reliability $RL_{NC}$ of the new center coordinate position NC. The new center coordinate position NC and the reliability $RL_{NC}$ are used in the next execution of this routine as LC and $RL_{LC}$ at the step 190.

Subsequently, at a step 280, the data of $PC_1$, $RL_1$, $PC_2$ and $RL_2$ are erased. At a subsequent step 290, the data of the temporary center coordinate positions TC stored in the memory A are all erased.

As appreciated, when the new center coordinate position NC and its reliability $RL_{NC}$ are set at the step 270, only the data stored in the memory A are erased for storing only new data of TC at the step 130 in the next execution of this routine, while, the data stored in the memory B are maintained for further storing new data of TC at the step 130 in the next execution of this routine.

On the other hand, if the decision at the step 260 is YES, i.e. the movement of the center coordinate position is larger than the constant K, the routine returns to the step 100. In this case, no correction of the current center coordinate position LC derived at the step 200 or 270 in the prior execution of this routine is made. Accordingly, the current center coordinate position LC and its reliability $RL_{LC}$ are used in the next execution of this routine as LC and $RL_{LC}$ at the step 190.

Now, it is assumed that the new center coordinate position NC was derived at the step 270 in the prior execution of this routine. The data stored in the memory A were erased at the step 290 in the prior execution of this routine, and only new data of TC are stored in the memory A at the step 130 in the current execution of this routine. On the other hand, the data stored in the memory B were maintained in the prior execution and the new data of TC which are the same as those stored in the memory A at the 130 in the current execution, are added to the memory B in the current execution.

Further assuming that environmental magnetic conditions, including the geomagnetic condition, are constant, the reliability $RL_{LC}$ of LC and the reliability $RL_1$ of $PC_1$ become substantially the same. Accordingly, the decision at the step 190 becomes NO to cause the routine to proceed to the steps 250 and 260. Since the magnetic conditions are constant, the decision at the step 260 becomes NO to cause the routine to go to the step 270 where the preliminary center coordinate position $PC_2$ derived at the step 170 and its reliability $RL_2$ derived at the step 180 are set to be NC and $RL_{NC}$, respectively. Accordingly, if the magnetic conditions are constant, the new center coordinate position NC is sequentially derived at the step 270 every time the routine is executed, so as to increase accuracy of NC with the new data added to the memory B at the step 130.

On the other hand, when some disturbance of the environmental magnetism, such as, the disturbance of the environmental geomagnetism has been occurred, the reliability $RL_1$ of $PC_1$ becomes less as appreciated from the above-noted equations (7), (8) and (9), while, the reliability $RL_{LC}$ of LC was derived in the prior execution where no disturbance of the environmental magnetism occurred. Accordingly, the decision at the step 190 in the current execution becomes NO, and the routine goes to the steps 250 and 260. If the decision at the step 260 is NO, i.e. the distance $D_{PC1-LC}$ derived at the step 250 is no more than the constant K, then the routine goes to the step 270 to derive NC and $RL_{NC}$ as described above. On the other hand, if the decision at the step 260 is YES, i.e. the distance $D_{PC1-LC}$ is larger than the constant K, then the routine returns to the step 100 so that no correction of the current center coordinate position LC is performed in the current execution of this routine.

The step 260 is provided for checking whether the center coordinate position has been actually shifted from the first position to the second position. Specifically, the preliminary center coordinate position $PC_1$ fluctuates when the magnetic disturbance is generated, which, however, does not directly result in the shift of the center coordinate position. Accordingly, even though the distance $D_{PC1-LC}$ derived at the step 250 is larger than the constant K, the routine returns to the step 100 until the decision at the step 190 becomes YES, i.e. the reliability $RL_1$ becomes larger than $RL_{LC}$ where the center coordinate position has been actually shifted from the first position to the second position. In other words, when the center coordinate position has been actually shifted from the first position to the second position due to, for example, the shift of the magnetization level on the vehicle body from the first level to the second level, the center coordinate position becomes stable at the second position until the magnetization level is shifted to a third level from the second level.

If the decision at the step 190 becomes YES as noted above, then the routine proceeds to the step 200 to set $PC_1$ derived at the step 150 and its reliability $RL_1$ derived at the step 160 to be NC and $RL_{NC}$. Subsequently, the data stored in the memory B are replaced by the data stored in the memory A at the steps 210 and 220 for further storing the new data of TC at the step 130 in the next execution of this routine. While the magnetization level is remained in the second level, the new center coordinate position NC is derived based on the data stored in the memory B, i.e. NC is derived at the step 270, so that the number of the data stored in the memory B increases every time the routine is executed.

It is to be appreciated that the shift of the center coordinate position is also generated due to, other than the shift of the vehicular magnetization level, such as, opening and closing operations of a sunshine roof with the geomagnetic direction sensor being disposed near the sunshine roof, opening and closing operations of a sun visor with the geomagnetic direction sensor being disposed near the sun visor, existence of magnetic substance being disposed near the geomagnetic direction sensor, and environmental conditions around the vehicle, for example, among high buildings or on a road under a high level road, and the like.

The new center coordinate position NC derived at the step 200 or 270 is fed to an interrupt routine (corresponding to the direction deriving means 8 in FIG. 1) which is executed per a predetermined unit time for deriving a traveling direction $\theta$ of the vehicle based on the following equation (16).

$$\theta = \tan^{-1} \frac{Vy - Vy_{NC}}{Vx - Vx_{NC}} \qquad (16)$$

wherein, Vx and Vy are X and Y coordinate values sequentially fed from the geomagnetic direction sensor 2 through the output process means 4, and $Vx_{NC}$ and $Vy_{NC}$ are X and Y coordinate values of the new center coordinate position NC derived at the step 200 or 270.

It is to be appreciated that when the decision at the step 260 is YES, the current center coordinate position LC is fed to the interrupt routine for deriving the traveling direction $\theta$ of the vehicle. In this case, $Vx_{LC}$ and $Vy_{LC}$ are used as $Vx_{NC}$ and $Vy_{NC}$ in the above-noted equation (16).

Figure 12:
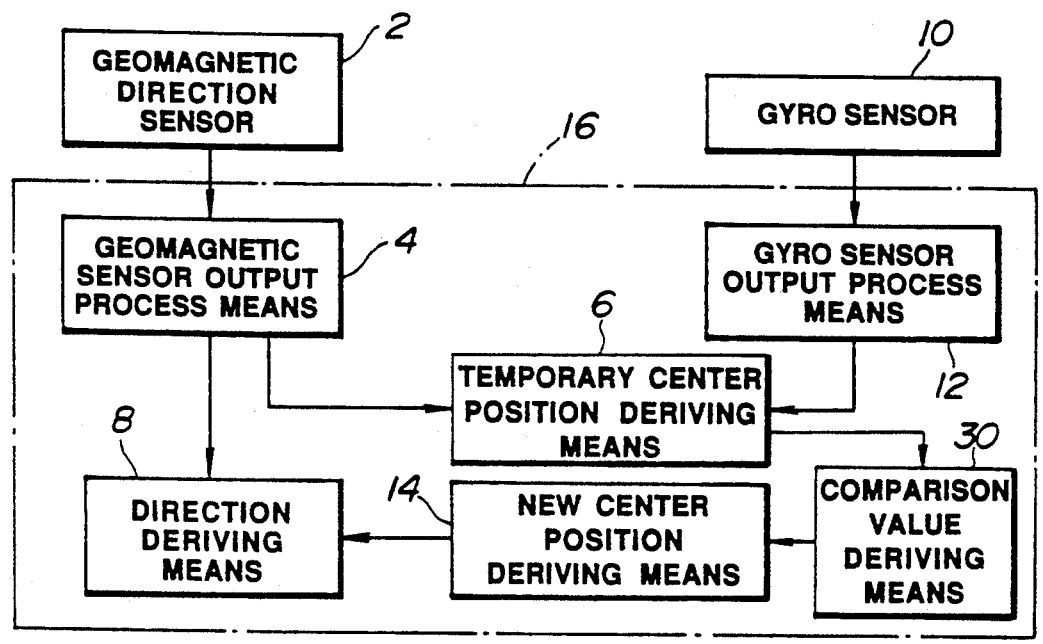
FIG. 12 is a schematic block diagram showing the second preferred embodiment of the present invention.

FIG. 12 shows a functional block diagram of the vehicular traveling direction measuring system of the second preferred embodiment for schematically explaining the general concepts thereof. In FIG. 12, the same or similar blocks are designated by the same reference numerals as in FIG. 1 so as to omit explanation thereof for avoiding a redundant disclosure.

In the second preferred embodiment of FIG. 12, comparison value deriving means 30 is added between the temporary center position deriving means 6 and the new center position deriving means 14. The comparison value is used for deciding whether the center coordinate position has been shifted, which will be described later in detail.

Figure 13:
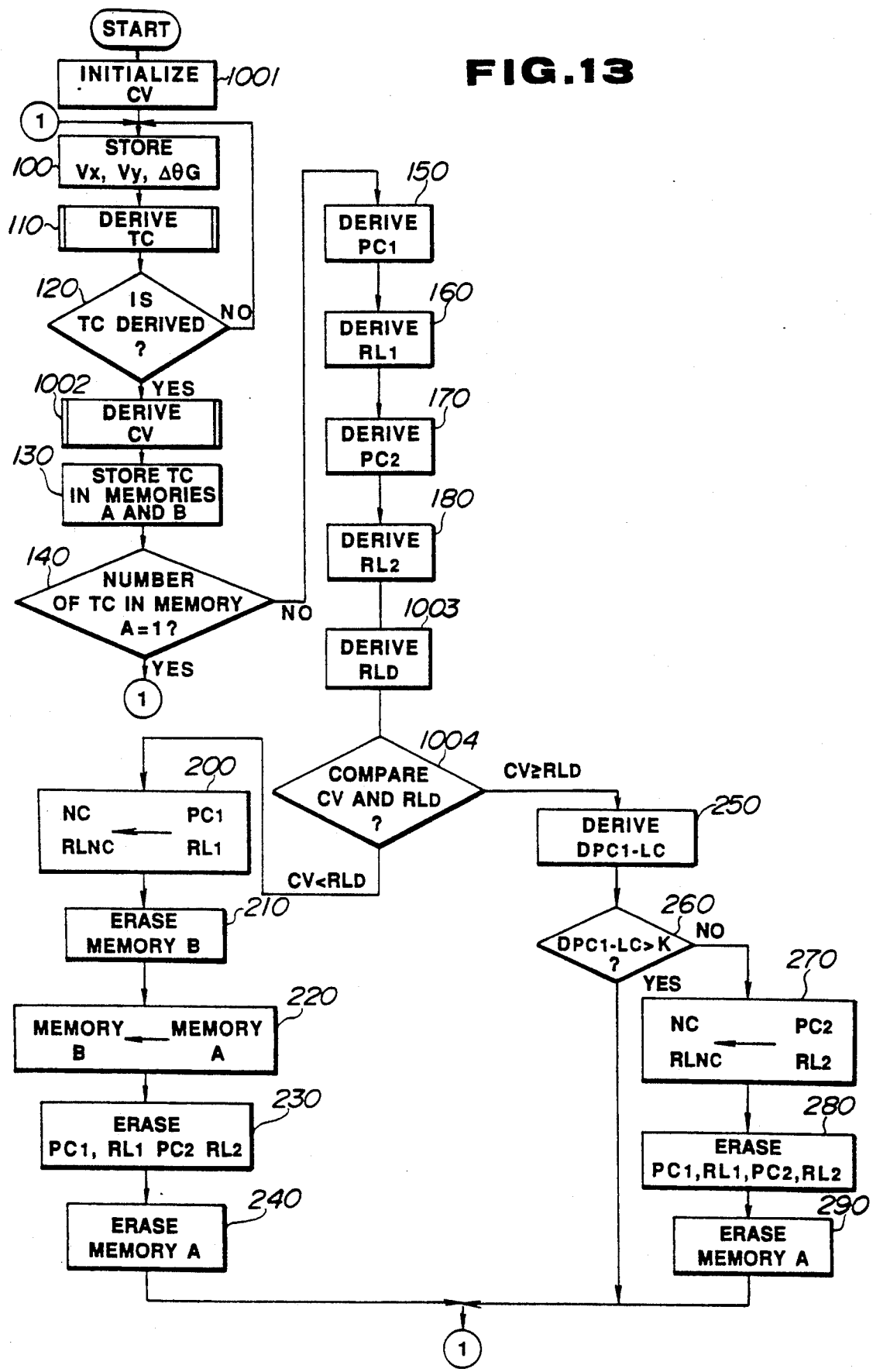
FIG. 13 is a flowchart of a main routine to be executed by a control unit in the second preferred embodiment of FIG. 12 for deriving a new or corrected center coordinate position of a corresponding output circle.

FIG. 13 shows a flowchart of a main routine to be executed by the control unit 16 for deriving a new or corrected center coordinate position of a corresponding output circle. In FIG. 13, the same or similar steps are designated by the same reference numerals as in FIG. 11 so as to omit explanation thereof for avoiding a redundant disclosure.

When power is first applied to the control unit 16, a comparison value CV is initialized at a first step 1001, such as, to a value of 1. Then, the routine proceeds to a step 1002 through the steps 100 to 120. At the step 1002, the comparison value CV is derived through a subroutine as shown in FIG. 14.

Figure 14:
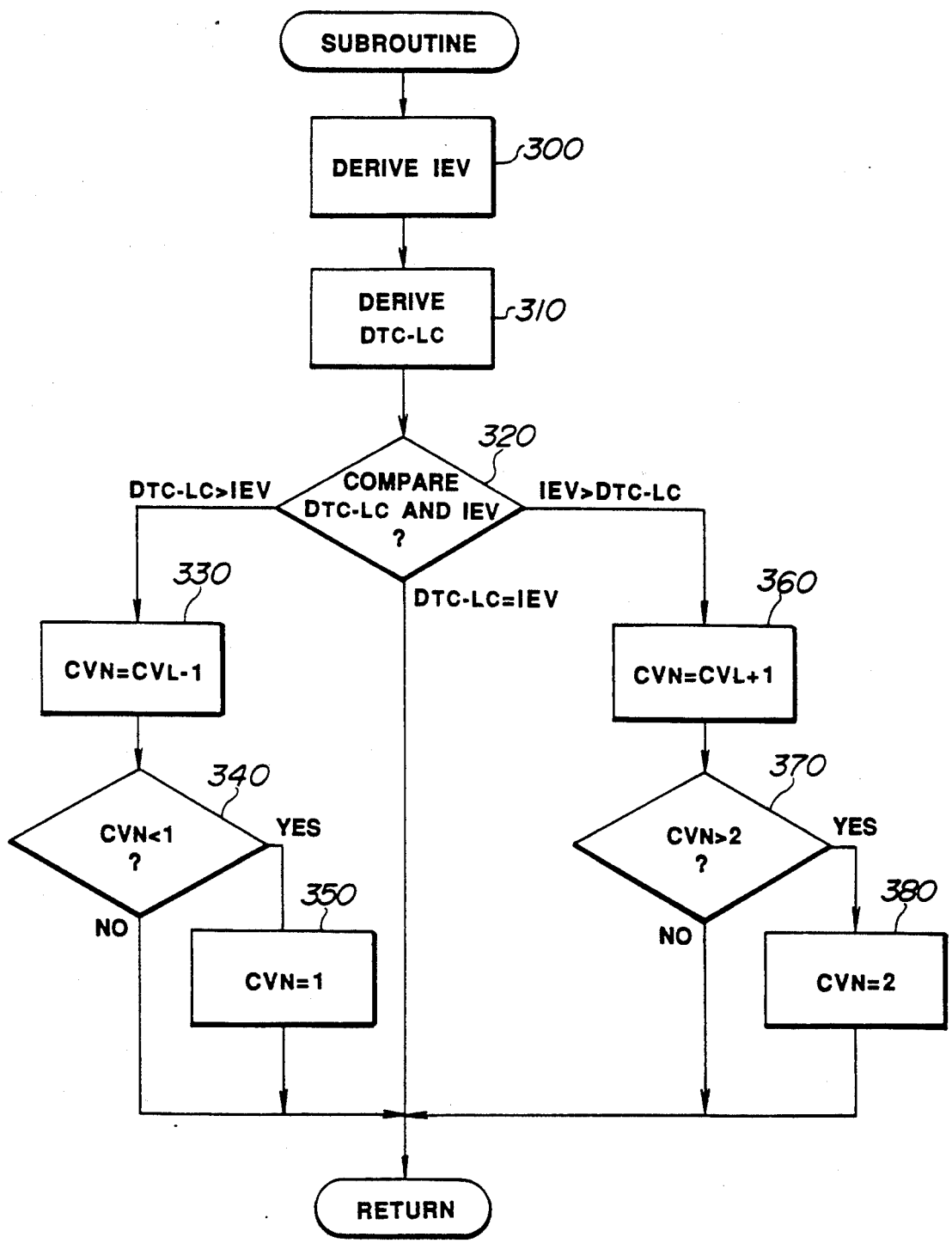
FIG. 14 is a flowchart showing a subroutine to be executed by the control unit in the second preferred embodiment for deriving a comparison value to be used when deciding whether the center coordinate position has been shifted.

In the subroutine of FIG. 14, at a first step 300, an interval estimate value IEV is derived based on the following equation (17).

$$IEV = 1.96 \times \delta_{LC} \qquad (17)$$

wherein, $\delta_{LC}$ is a standard deviation of the current center coordinate position LC derived at the step 200 or 270 in the prior execution of this routine, or derived in a further prior execution of this routine when the decision at the step 260 is YES. As appreciated from the foregoing first preferred embodiment, the standard deviation $\delta_{LC}$ is $\delta_{PC1}$ of $PC_1$ or $\delta_{PC2}$ of $PC_2$ derived at the step 160 or 180 in the prior execution of this routine using the foregoing equations (7) or (12).

Subsequently, the routine proceeds to a step 310 where a distance $D_{TC-LC}$ between an instantaneous temporary center coordinate position TC derived at the step 110 and the current center coordinate position LC is derived based on the following equation (18).

$$D_{TC-LC} = \{(Vx_{TC} - Vx_{LC})^2 + (Vy_{TC} - Vy_{LC})^2\}^{\frac{1}{2}} \qquad (18)$$

wherein, $Vx_{TC}$ and $Vy_{TC}$ are X and Y coordinate values of the instantaneous temporary center coordinate position TC.

Subsequently, the routine goes to a step 320 where IEV derived at the step 300 and $D_{TC-LC}$ derived at the step 310 are compared for checking possibility of the shift of the center coordinate position. Specifically, if it is decided at the step 320 that $D_{TC-LC}$ is larger than IEV, which means that the possibility of the shift of the center coordinate position is large, then the routine goes to a subsequent step 330 where a new comparison value $CV_N$ is derived by subtracting a value of 1 from a current comparison value $CV_L$ derived in the prior execution of this subroutine. At a subsequent step 340, it is decided whether $CV_N$ derived at the step 330 is less than a reference value 1. If a decision at the step 340 is NO, i.e. $CV_N$ is no less than 1, then the derived $CV_N$ is used at a step 1004 in FIG. 13 for deciding whether the shift of the center coordinate position has been occurred. On the other hand, if the decision at the step 340 is YES, i.e. $CV_N$ is less than 1, then the routine goes to a step 350 where $CV_N$ is set to the reference value 1 which is used at the step 1004 in FIG. 13 for deciding whether the shift of the center coordinate position has been occurred.

On the other hand, if it is decided at the step 320 that IEV is larger than $D_{TC-LC}$, which means that the possibility of the shift of the center coordinate position is small, then the routine goes to a subsequent step 360 where a new comparison value $CV_N$ is derived by adding a value of 1 to the current comparison value $CV_L$ derived in the prior execution of this subroutine. At a subsequent step 370, it is decided whether $CV_N$ derived at the step 360 is larger than a reference value 2. If a decision at the step 370 is NO, i.e. $CV_N$ is no more than 2, then the derived $CV_N$ is used at the step 1004 in FIG. 13 for deciding whether the shift of the center coordinate position has been shifted. On the other hand, if the decision at the step 370 is YES, i.e. $CV_N$ is more than 2, then the routine goes to a step 380 where $CV_N$ is set to the reference value 2 which is used at the step 1004 in FIG. 13 for deciding whether the shift of the center coordinate position has been shifted.

Accordingly, $CV_N$ takes the value of 1 or 2 depending on the possibility of the shift of the center coordinate position which is decided at the step 320. If it is decided at the step 320 that IEV is equal to $D_{TC-LC}$, then no derivation of $CV_N$ is performed and the current comparison value $CV_L$ derived in the prior execution of this subroutine is used at the step 1004 in FIG. 13 for deciding whether the center coordinate position has been shifted.

Now, the routine of FIG. 13 proceeds to a step 1003 through steps 130 to 180. At the step 1003, a reliability difference $RL_D$ between $RL_{PC1}$ derived at the step 160 and $RL_{LC}$ derived at the step 160 or 180 in the prior execution of this routine is derived based on the following equation (19).

$$RL_D = RL_{PC1} - RL_{LC} \tag{19}$$

Subsequently, at a step 1004, the comparison value derived at the step 1002 and the reliability difference $RL_D$ derived at the step 1003 are compared. If a decision at the step 1004 is that the comparison value CV is less than the reliability difference $RL_D$, i.e. the center coordinate position has been shifted, then the routine proceeds to the step 200 to set $PC_1$ derived at the step 150 and $RL_{PC1}$ derived at the step 160 to be the new center coordinate position NC and its reliability $RL_{NC}$ as in the foregoing first preferred embodiment. The subsequent steps 210 to 240 are the same as those in the foregoing first preferred embodiment. On the other hand, if the decision at the step 1004 is that the comparison value CV is no less than the reliability difference $RL_D$, i.e. the center coordinate position has not been shifted, then the routine proceeds to the steps 250 to 290 which are processed in the same manner as in the foregoing first preferred embodiment.

As appreciated, in the second preferred embodiment, since the comparison value CV, which is set smaller when the possibility of the shift of the center coordinate position is large and which is set larger when the possibility of the shift of the center coordinate position is smaller, is utilized in addition to the reliabilities $RL_{PC1}$ and $RL_{LC}$ for deciding whether the shift of the center coordinate position has been occurred, the shift of the center coordinate position can be detected with high accuracy at the step 1004.

It is to be understood that this invention is not to be limited to the preferred embodiments described above, and that various changes and modifications may be made without departing from the spirit and scope of the invention as defined in the appended claims.

What is claimed is:

1. A system for measuring a traveling direction of a vehicle comprising:
    a geomagnetic sensor, mounted to the vehicle, which is operable to sequentially derive a set of data relating to the geomagnetism around the vehicle, said data having components in two directions which are orthogonal to each other on a horizontal plane to define a first coordinate position by each set of said two directional component data,
    a control circuit operatively connected to said geomagnetic sensor, said control circuit
    including:
    first means for sequentially deriving a second center coordinate position of a corresponding output circle based on said first coordinate position;
    second means for storing a first group of said second center coordinate position data;
    third means for storing a second group of said second center coordinate position data;
    fourth means for deriving a third center coordinate position based on said first group of the second center coordinate position data;
    fifth means for deriving a first value indicative of reliability of said third center coordinate position based on said first group of the second center coordinate position data and said third center coordinate position;
    sixth means for deriving a fourth center coordinate position based on said second group of the second center coordinate position data;
    seventh means for deriving a second value indicative of reliability of said fourth center coordinate position based on said second group of the second center coordinate position data and said fourth center coordinate position;
    eighth means for deciding which of said third and fourth center coordinate positions is to be selected for deriving a traveling direction of the vehicle;
    ninth means, in response to said eighth means selecting said third center coordinate position, for setting said third center coordinate position to be a first finally corrected center coordinate position;
    tenth means, in response to said eighth means selecting said fourth center coordinate position, for setting said fourth center coordinate position to be a second finally corrected center coordinate position;
    said eighth means selecting said third or fourth center coordinate position based on said first reliability indicative values derived in current and prior executions of said fifth means, respectively, when said first finally corrected center coordinate position being set in the prior execution of said ninth means, and based on said first and second reliability indicative values derived in the current and prior executions of said fifth and seventh means, respectively, when said second finally corrected center coordinate position being set in the prior execution of said tenth means;
    whereby said control circuit derives the traveling direction of the vehicle based on a direction from said first or second finally corrected center coordinate position toward said first coordinate position defined by said two directional component data.

2. The system as set forth in claim 1, wherein said tenth means includes eleventh means for deriving a distance between said third center coordinate position derived in the current execution of said fourth means and said first or second finally corrected center coordinate position set in the prior execution of said ninth or tenth means, and twelfth means for comparing said distance with a preset value, and wherein said tenth means sets said second finally corrected center coordinate position when said distance is no more than said preset value and performs no setting of said finally corrected second center coordinate position when said distance is more than said preset value.

3. The system as set forth in claim 2, wherein said first and second groups of the data are maintained when said tenth means performs no setting of said second finally corrected enter coordinate position.

4. The system as set forth in claim 1, wherein said eighth means decides to select said third center coordinate position when said first reliability indicative value derived in the current execution of said fifth means is larger than said first or second reliability indicative value derived in the prior execution of said fifth or seventh means.

5. The system as set forth in claim 1, wherein said second group of the data is replaced by said first group of the data when said first finally corrected center coordinate position is set by said ninth means, and wherein said first group of the data stored in said second means is erased when said first finally corrected center coordinate position is set by said ninth means.

6. The system as set forth in claim 1, wherein said first group of the data is erased when said second finally corrected center coordinate position is set by said tenth means, and wherein said second group of the data is maintained.

7. The system as set forth in claim 1, wherein said first reliability indicative value is derived based on following equations:

$$\delta_{PC1} = \left(\left[\left\{\sum_{i=1}^{n}(Vx_{TCi} - Vx_{PC1})^2 + (Vy_{TCi} - Vy_{PC1})^2\right\}/n\right]^{\frac{1}{2}}\right)$$

$$\delta_{PC1R} = \delta_{PC1} \times 100/R$$

$$RL_1 = 1/\delta_{PC1R}^2$$

wherein, $Vx_{TC}$ and $Vy_{TC}$ are X and Y coordinate values, respectively, of said second center coordinate position stored in said second means, $Vx_{PC1}$ and $Vy_{PC1}$ are X and Y coordinate values, respectively, of said third center coordinate position, n denotes the number of $Vx_{TC}$ and $Vy_{TC}$, respectively, stored in said second means, R is an average output value of the geomagnetism, and $RL_1$ is said first reliability indicative value, and wherein said second reliability indicative value is derived based on following equations:

$$\delta_{PC2} = \left(\left[\left\{\sum_{i=1}^{n}(Vx_{TCi} - Vx_{PC2})^2 + (Vy_{TCi} - Vy_{PC2})^2\right\}/n\right]^{\frac{1}{2}}\right)$$

$$\delta_{PC2R} = \delta_{PC2} \times 100/R$$

$$RL_2 = 1/\delta_{PC2R}^2$$

wherein, $Vx_{TC}$ and $Vy_{TC}$ are X and Y coordinate values, respectively, of said second center coordinate position stored in said third means, $Vx_{PC2}$ and $Vy_{PC2}$ are X and Y coordinate values, respectively, of said fourth center coordinate position, n denotes the number of $Vx_{TC}$ and $Vy_{TC}$, respectively, stored in said third means, R is an average output value of the geomagnetism, and $RL_2$ is said second reliability indicative value.

8. The system as set forth in claim 1, further comprising a thirteenth means for deriving a comparison value wherein said eighth means includes a fourteenth means for deriving a difference between said first reliability indicative value derived in the current execution of said fifth means and said first or second reliability indicative value derived in the prior execution of said fifth or seventh means, and a fifteenth means for comparing said comparison value with said difference for deciding which of said third and fourth center coordinate positions is to be selected for deriving a traveling direction of the vehicle.

9. The system as set forth in claim 8, wherein said fifteenth means decides to select said third center coordinate position when said comparison value is less than said difference.

10. The system as set forth in claim 9, wherein said fifth means derives a first standard deviation of said third center coordinate position based on the following equation:

$$\delta_{PC1} = \left(\left[\left\{\sum_{i=1}^{n}(Vx_{TCi} - Vx_{PC1})^2 + (Vy_{TCi} - Vy_{PC1})^2\right\}/n\right]^{\frac{1}{2}}\right)$$

wherein, $Vx_{TC}$ and $Vy_{TC}$ are X and Y coordinate values, respectively, of said second center coordinate position stored in said third means, $Vx_{PC1}$ and $Vy_{PC1}$ are X and Y coordinate values, respectively, of said third center coordinate position, n denotes the number of $Vx_{TC}$ and $Vy_{TC}$, respectively, stored in said second means, and $\delta_{PC1}$ is said first standard deviation, and wherein said seventh means derives a second standard deviation of said fourth center coordinate position based on a following equation:

$$\delta_{PC2} = \left(\left[\left\{\sum_{i=1}^{n}(Vx_{TCi} - Vx_{PC2})^2 + (Vy_{TCi} - Vy_{PC2})^2\right\}/n\right]^{\frac{1}{2}}\right)$$

wherein, $Vx_{TC}$ and $Vy_{TC}$ are X and Y coordinate values, respectively, of said second center coordinate position stored in said third means, $Vx_{PC2}$ and $Vy_{PC2}$ are X and Y coordinate values, respectively, of said fourth center coordinate position, n denotes the number of $Vx_{TC}$ and $Vy_{TC}$, respectively, stored in said third means, and $\delta_{PC2}$ is said second standard deviation, and wherein said thirteenth means includes sixteenth means for deriving a third value based on said first standard deviation derived in the prior execution of said fifth means when said first finally corrected center coordinate position was set in the prior execution of said ninth means, and based on said second standard deviation derived in the prior execution of said seventh means when said second finally corrected center coordinate position was set in the prior execution of said tenth means, and seventeenth means for deriving a distance between an instantaneous value of said second center coordinate position and said first or second finally corrected center coordinate position set in the prior execution of said ninth or tenth means, and eighteenth means for comparing said third value with said distance to derive said comparison value.

11. The system as set forth in claim 10, wherein said third value is derived based on a following equation;

$$IEV = 1.96 \times \delta_{LC}$$

wherein, IEV is said third value and $\delta_{LC}$ is said first or second standard deviation derived in the prior execution of said fifth or seventh means.

12. The system as set forth in claim 10, wherein said eighteenth means includes nineteenth means for subtracting a predetermined value from said comparison value derived in the prior execution of said thirteenth means to derive a corrected comparison value when said distance is larger than said third value and for adding said predetermined value to said comparison value derived in the prior execution of said thirteenth means to derive a corrected comparison value when said third value is larger than said distance.

13. The system as set forth in claim 12, wherein said eighteenth means performs no correction of said comparison value derived in the prior execution of said eighteenth means when said third value is equal to said distance.

14. The system as set forth in claim 12, wherein said eighteenth means includes retaining means for retaining said corrected comparison value to no less than a first given value when said nineteenth means subtracts said predetermined value from said comparison value and for retaining said corrected value to no more than a second given value when said nineteenth means adds said predetermined value to said comparison value.

* * * * *